May 22, 1923.
C. KREY
AUTOMOBILE BED
Filed June 3, 1922 3 Sheets-Sheet 3
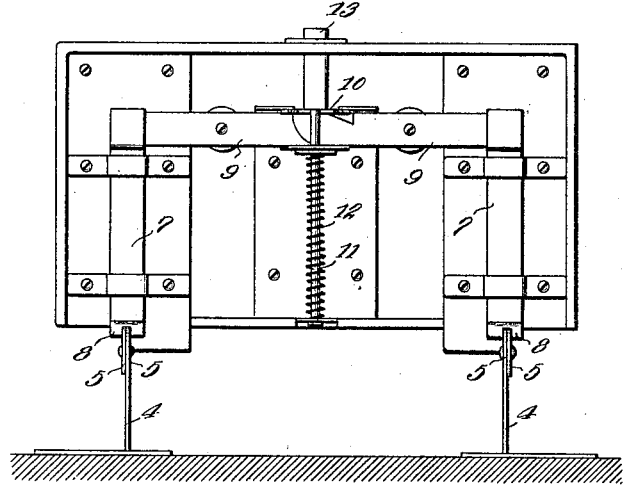
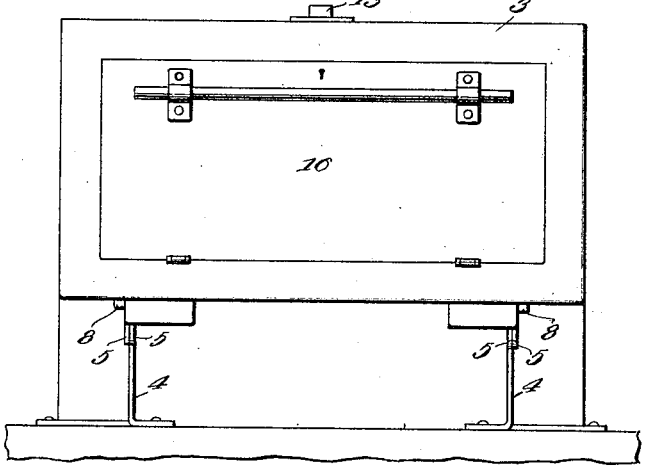
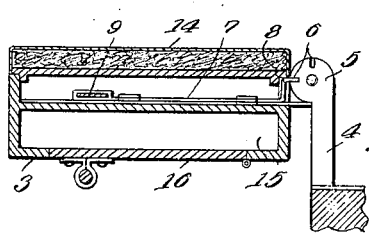
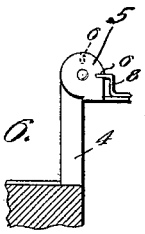
Carl Krey
INVENTOR
BY Victor J. Evans
ATTORNEY
WITNESS:

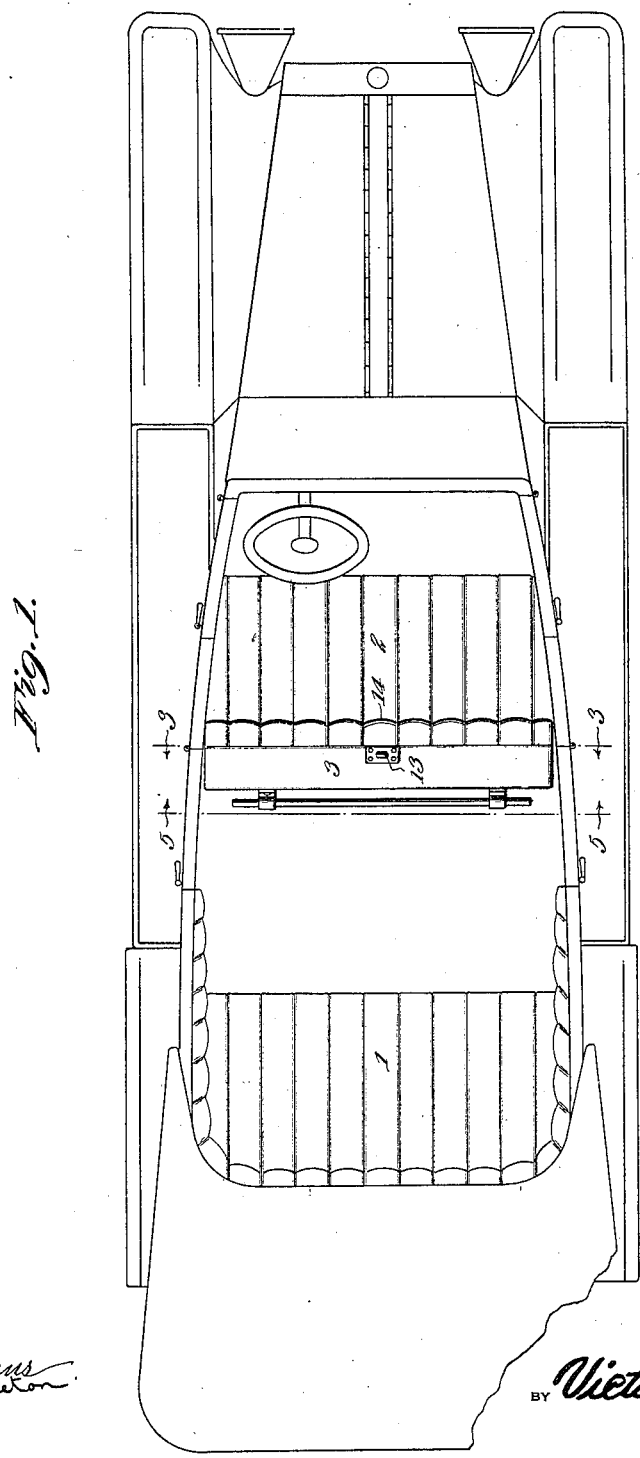

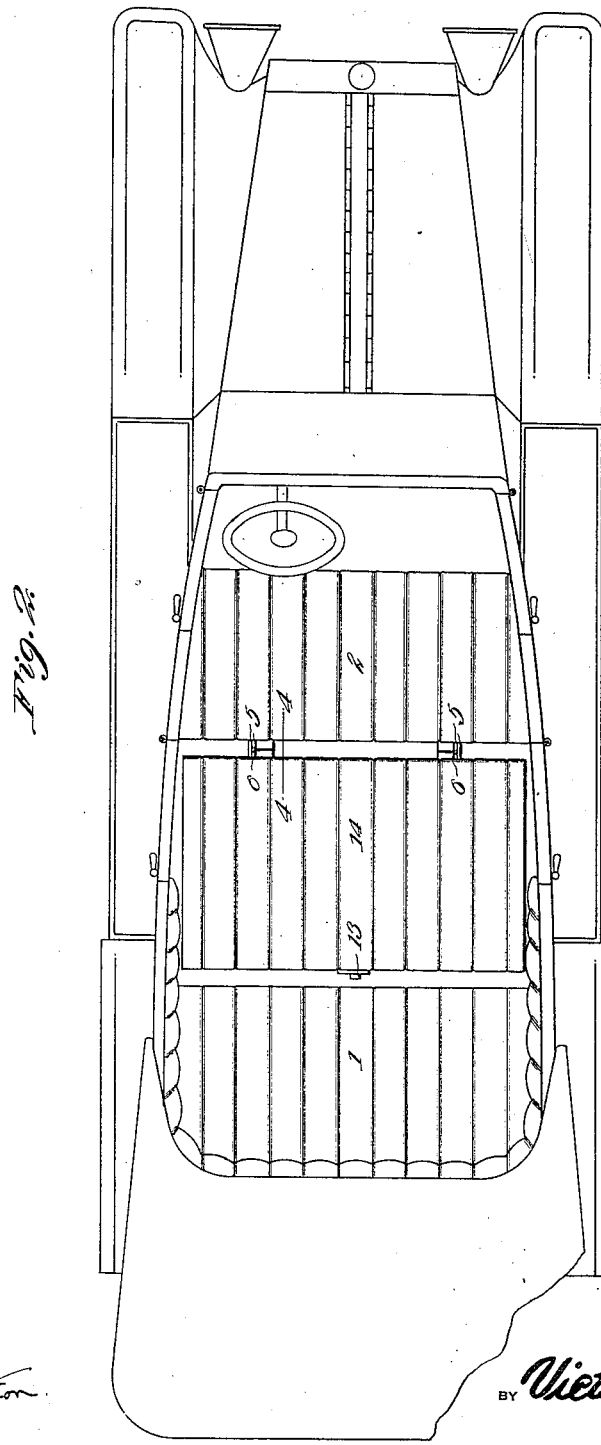

Patented May 22, 1923.

1,456,384

UNITED STATES PATENT OFFICE.

CARL KREY, OF BATTLE CREEK, MICHIGAN.

AUTOMOBILE BED.

Application filed June 3, 1922. Serial No. 565,531.

*To all whom it may concern:*

Be it known that I, CARL KREY, a citizen of the United States, residing at Battle Creek, in the county of Calhoun and State of Michigan, have invented new and useful Improvements in Automobile Beds, of which the following is a specification.

This invention relates to improvements in automobiles, the general object of the invention being to so form the seats that they may be converted into a bed when desired.

Another object of the invention is to provide means for holding the back of the front seat in either upright or horizontal position, said back forming the central part of the bed when in horizontal position.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a plan view of an automobile supplied with my invention, showing the parts in normal position.

Figure 2 is a similar view with the parts in bed forming position.

Figure 3 is a section on line 3—3 of Figure 1.

Figure 4 is a section on line 4—4 of Figure 2.

Figure 5 is a section on line 5—5 of Figure 1. Figure 6 is a detail view of the hinge and the locking means therefor.

In these views 1 indicates the cushion of the rear seat, 2 the cushion of the front seat and 3 the back of the front seat. This back is hingedly connected with the seat part by the hinges 4, each hinge part including a pair of circular plates 5 which are pivotally connected together and each of which is provided with a pair of notches 6. The notches of each pair being arranged at right angles to each other for a purpose to be later described, the back carries a pair of bolts 7 which are slidably supported in the back and have their bent ends 8 adapted to engage a parallel set of notches 6. These bolts are moved inwardly and outwardly by the pivoted members 9, the adjacent ends of which are located in a bracket 10 which is slidably mounted on a stem 11 and is held in its upper position with the bolts engaging the notches by the spring 12 on the stem. A button 13 passes through a hole in the upper part of the back and is secured to the upper end of the stem, said button having a part engaging the bracket so that when the button is depressed the bracket will be moved downwardly, thus tilting the levers 9 and moving their outer ends upwardly and thus drawing the bolts upwardly and freeing their lower ends from the notches. The notches are so arranged in the circular plates 5 that when the back is in upright position a notch in a plate of each pair will be horizontally aligned with the notch of the other plate so that the bolt can enter its respective notch and thus lock the back in upright position. When the back is in horizontal position a set of notches in each pair of members will also be in register so that the bolts may enter to lock the back in this horizontal position. The bolt parts in the back are covered by a cushion 14 and when the back is in a horizontal position it will occupy the space between the front and rear seats, thus forming the central part of the bed. The body of the automobile may be provided with one or more recesses 15 for receiving the bed clothing. The recess is closed by a door 16.

From the above it will be seen that the seats may be easily and quickly converted into a bed by simply pushing down the button 13 to release the bolts from the notches, then swinging the back downwardly into horizontal position, the back being held in this position by the spring 12 actuating the parts to force the bolts into the notches. The bed clothing will then be placed on the two seat cushions and the cushion of the back to form the bed. When not in use this bed clothing may be carried in the chamber 15 formed in the body of the car.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with an automobile, a front seat having its back hingedly connected with the seat, the hinged means including circular parts pivotally connected together and these parts being provided with a pair of notches arranged at right angles but being adapted to register with the notches of the other part, bolts carried by the back and having portions engaging said registering notches to hold the back in upright or horizontal position, a pair of members pivotally secured intermediate of their ends to the back and having their outer ends operatively associated with the opposite ends of the bolts and their inner ends in overlapping engagement, a bracket carried by the overlapping ends, spring means supporting the bracket and a button engaging the bracket for the purpose specified.

In testimony whereof I affix my signature.

CARL KREY.